Patented Apr. 30, 1946

2,399,401

UNITED STATES PATENT OFFICE 2,399,401

POLYVINYL ALCOHOL COMPOSITIONS

Harold M. Sonnichsen and Robert F. Gager, Niagara Falls, N. Y., assignors to E. I. du Pont de Nemours & Company, Wilmington, Del., a corporation of Delaware No Drawing. Application April 21, 1943, Serial No. 483,940

2 Claims. (Cl. 260—36)

This invention relates to improved plasticized polyvinyl alcohol compositions.

Polyvinyl alcohol is a polymeric, resinous, hydrophilic compound which may be made by hydrolyzing polyvinyl acetate to remove ester groups. As ordinarily used, and as used herein, "polyvinyl alcohol" is used to include the partially hydrolyzed products in which 50 mole per cent or more of the ester groups have been removed by hydrolysis. Herein when the percentage of hydrolysis is used to identify various grades of polyvinyl alcohol, we refer to molar percentages, not to per cent by weight.

A number of plasticizers for polyvinyl alcohol are known, but all of those which have found wide use are water-soluble, extremely hygroscopic substances such as glycerol, glycol, formamide, ethanol formamide, ethanol acetamide, ethanolamine salts, polyglycols such as di- and triethylene glycol, and glycerol derivatives such as glycerol monohydroxyacetate. In the case of completely hydrolyzed polyvinyl alcohol, no plasticizers were previously known which were sufficiently compatible with the polymer in the absence of water to permit fabrication of soft, flexible, rubbery articles. In order to obtain tubing, moldings, and sheeting of Shore durometer hardness below 85, it has been necessary to add water to the plasticizers used. This water is lost in dry atmospheres and causes shrinkage and hardening of the objects fabricated from polyvinyl alcohol. Conversely, the presence of hygroscopic plasticizers in polyvinyl alcohol causes absorption of water in humid atmospheres with resultant swelling, softening, and "sweating" (condensation of water on the surface).

A few plasticizers which are relatively water-insoluble and non-hygroscopic are known to be compatible with polyvinyl alcohols containing a large proportion of residual acetate groups. Methyl phthalyl methyl glycolate, paratoluene sulfonamide, glycol or glycol ether phthalates, and polyethylene glycol sebacate are representatives of this class. However, their compatibility decreases rapidly as the number of acetyl groups in the polymer is decreased and their efficiency in producing soft and elastic objects is inferior.

Another somewhat unexpected disadvantage in the use of the above plasticizers is that polyvinyl alcohols which are between 50 and 95% hydrolyzed are considerably more water sensitive than the completely hydrolyzed materials. Thus what is gained by using water-insoluble plasticizers is lost by the increased intrinsic water sensitivity of the resin.

Aldehydes are known to form water-insoluble acetals of polyvinyl alcohol, and there are a number of references in the patent literature to the use of various aldehydes and aldehyde-amine or aldehyde-amide condensation products for decreasing the water sensitivity of polyvinyl alcohol. In every case which has come to our attention, the product of these reactions is a hard substance which requires plasticization to produce a flexible, elastic, rubbery article.

It has also been our experience heretofore that mixing of two plasticizers is of no advantage in increasing compatibility, softness, or elasticity of polyvinyl alcohol compositions. We have investigated mixtures of glycerol and triethylene glycol, glycerol and ethanol formamide, ethanol formamide and triethylene glycol, and a number of similar compositions, but in no case was it possible to make a soft and flexible molding from completely saponified polyvinyl alcohol without adding water.

Previous work on plasticizers has indicated that the hydroxyl group, the amino group, and the amide group are characteristic of organic liquids compatible with polyvinyl alcohol. This is consistent with the strong hydrogen bonding demonstrated to exist in polyvinyl alcohol by X-ray studies. It is logical to suppose that a plasticizer or solvent for polyvinyl alcohol must possess sufficient donor or acceptor capacity to associate with the hydroxyl groups in polyvinyl alcohol, and since a strong hydrogen bond presumably exists in solid polyvinyl alcohol, a strong donor group is required to compete with the natural tendency of polyvinyl alcohol molecules to associate with each other. Water, glycerol, and formamide are typical of this type of solvent plasticizer previously known in the art.

An object of this invention is to provide new and improved plasticized polyvinyl alcohol compositions. A further object is to provide plasticized polyvinyl alcohol compositions containing little or no water which do not shrink or harden on exposure to drying conditions. Another object is to provide such compositions which are relatively insensitive to humid conditions and do not tend to swell, soften or otherwise change properties when exposed to moisture. Further objects will be hereinafter apparent.

In accordance with our invention, polyvinyl alcohol is plasticized by incorporating therein one or more aldehydes, together with one or more organic hydroxy compounds which are not monohydric alcohols. The hydroxy compounds may be, for example, those hydrophilic hydroxy compounds which have been utilized heretofore to plasticize polyvinyl alcohol, and these are commonly preferred. Examples of such are glycerol, ethanol formamide, triethylene glycol and other polyethylene glycols.

However, our invention is not restricted to those preferred hydroxy compounds, as any organic hydroxy compound may be utilized, except the monohydric alcohols. In addition to the above examples, the following are illustrative of hydroxy compounds suitable for our invention: glycols, such as ethylene glycol, propylene glycol, butylene glycol and the like; ethers and esters of glycerol and the glycols having at least one free hydroxyl group, like dimethyl glycerol ether, monomethyl ether of ethylene glycol, diethylene glycol, triethylene glycol and other polyethylene glycols, glycerol glycolate, glycol glycolate and diethylene glycol phthalate; hydroxy acids and their esters and amides, such as glycolic acid, salicylic acid, ethanol formamide, lactic acid, lactamide and ethyl lactate; hydroxy amides such as the alkanol amides, for example, methylol formamide, methylol acetamide, ethanol acetamide, propanol acetamide, ethanol butyramide, and the like; and phenolic compounds such as phenol, naphthol, resorcinol, phloroglucinol catechol, hydroquinone, cresol and phlorol.

Illustrative of aldehydes suitable for practicing our invention are: formaldehyde, acetaldehyde, propionaldehyde, butyraldehyde, caproaldehyde, enanthaldehyde, accrolein, crotonaldehyde, succinaldehyde, adipaldehyde, phenyl acetaldehyde, cinnamaldehyde, furfural, benzaldehyde, salicylaldehyde, p-chloro benzaldehyde, toluyl aldehyde and its homologs, alpha- and beta-naphthaldehydes and hydroxy naphthaldehydes. Of these, we have obtained the best results with benzaldehyde, furfural and crotonaldehyde. In general, we prefer to use aldehydes of low water solubility which have boiling points above 100° C.

The mixture of aldehyde and hydroxy compound used as plasticizer should have a melting point not higher than the temperature employed in the process of incorporating the plasticizer in the polyvinyl alcohol, e. g., the molding or extrusion temperature. That temperature ordinarily will not exceed about 200° C., as at higher temperatures polyvinyl alcohol tends to decompose. We prefer to work the plastic mass at temperatures of 150 to 160° C.; lower temperatures, down to room temperature may be employed, if desired.

We have found that mixtures of aldehydes and hydroxyl-containing plasticizers are more compatible with polyvinyl alcohol and give more flexible, rubbery and water-resistant products than the hydroxy compound plasticizers alone, with or without the addition of water.

Aldehydes alone have little effect on polyvinyl alcohol which is more than 75% hydrolyzed. They are neither solvents nor swelling agents for completely or nearly completely hydrolyzed polyvinyl alcohol, although they have a slight tendency to swell polyvinyl alcohols which contain between 60% and 25% residual acetate groups. Substantially no plasticizing effect is observed when aldehydes alone are molded with any grade of polyvinyl alcohol. The aldehyde is partially squeezed out by the pressure of the molding operation and resulting molding is weak, brittle, and non-uniform. It is, therefore, entirely unexpected that a relatively small amount of aldehyde is capable of assisting the plasticizing action of a conventional hydrophilic plasticizer for polyvinyl alcohol.

We have found, however, that considerable amounts of aldehydes are readily incorporated into the polyvinyl alcohol if correspondingly large amounts of the hydroxy compound are present and a well-plasticized composition is obtained. For example, when glycerol and benzaldehyde are used to plasticize polyvinyl alcohol, the preferred ranges are as follows:

|  | Parts |
|---|---|
| Polyvinyl alcohol | 50–90 |
| Benzaldehyde | 10–30 |
| Glycerin | 19–90 |

When larger quantities of aldehyde are added, they are eliminated during the molding process by being squeezed out of the solid mixture. These limits will depend somewhat on the type of aldehyde and the type of polyvinyl alcohol. Polyvinyl alcohols containing larger proportions of residual acetate groups are more compatible with the common plasticizers and generally are miscible with larger quantities of mixtures of aldehydes with hydroxy compounds.

The amount of aldehyde will vary depending on the particular aldehyde used, the grade of polyvinyl alcohol and the degree of plasticization desired. In general, we may use from 5 to 75% of the aldehyde, based on the weight of the polyvinyl alcohol, with a quantity of glycerin or other hydroxy compound plasticizer of 10 to 150% of the weight of the polyvinyl alcohol. The ratio of the hydroxy compound to aldehyde may vary from 1 to 30 parts by weight of hydroxy compound to one part by weight of aldehyde; generally we prefer 1 to 3 parts of hydroxy compound to one part of aldehyde. In the case of partially hydrolyzed grades of polyvinyl alcohol, large amounts of the hydroxy compound, e. g. up to 150%, can be used with relatively small amounts of aldehyde. On the other hand, in plasticizing the fully hydrolyzed grade of polyvinyl alcohol, an excess of the hydroxy compound, without sufficient aldehyde present, is not compatible with the polyvinyl alcohol. In any case where the amount of aldehyde or hydroxy compound, or both, is so large as to be incompatible with the polyvinyl alcohol, that excess will be squeezed out of the mass during the molding operation. Hence the method is self-adjusting and a reasonable excess of either component can be used to mold an article of satisfactory quality. We prefer, however, to avoid an excess and to utilize a mixture of aldehyde and hydroxy compound in which the ingredients are in such proportions and amounts as to be within the limits of compatibility with the polyvinyl alcohol. If necessary, those limits can be determined by simple tests consisting of molding the polyvinyl alcohol with various amounts of the plasticizers. Usually, the proportions indicated in the following examples give the best results. In almost all cases the preferred proportions are at least one part by weight of the hydroxy compound to one part of aldehyde.

The plasticizers may be incorporated by the well-known conventional methods. Water may be added if desired, but it is generally preferred to omit water entirely. The plasticized composition may be extruded, sheeted, molded or otherwise formed as desired, using conventional methods.

*Examples*

The examples tabulated below show the results obtained by plasticizing a completely hydrolyzed, high viscosity grade of polyvinyl alcohol according to our invention, in comparison with the attempted plasticization of this same polyvinyl alcohol with glycerol alone. The polyvinyl alcohol used was 99% hydrolyzed.

In these examples the hydroxy compound glycerol or ethanol formamide was mixed with the finely divided polyvinyl alcohol and allowed to stand until swelling occurred. The aldehyde then was added and the mixture allowed to stand over night. The swelled mixture then was molded at a temperature of 150 to 160° C. for a time of 20 to 30 minutes at the following pressures:

|  | Lbs. per sq. in. |
|---|---|
| For Example 1 | 800 |
| For Examples 2–5 | 600 to 3,200 |
| For Examples 6–10 | 600 to 1,600 |
| For Examples 11–15 | 1,300 |

The parts are by weight. The abbreviation "PVA" stands for polyvinyl alcohol.

grades of polyvinyl alcohol are particularly difficult to plasticize by the conventional methods and heretofore it has been impossible to make relatively soft, rubber-like articles from these grades without the addition of water. We have discovered that even the fully hydrolyzed grades (97 to 100% hydrolyzed) can readily be plasticized by the herein described combinations of aldehydes and hydroxy compounds, to produce compositions which can readily be molded or extruded to produce soft, rubber-like articles of high tensile strength.

| Example No. | Parts PVA | Parts (wt.) hydroxy compound | Parts (wt.) aldehyde | Shore "A" hardness | Clarity | Per cent water absorption | Retention of plasticizer | Cold crack T° C. | Tensile strength, lbs./sq. in. | Per cent elongation |
|---|---|---|---|---|---|---|---|---|---|---|
| 1 | 100 | Glycerol 50 | None | 85–88 | Opaque | 162 | Very poor | −5 | Too hard for convenience in measuring tensile and elongation. | |
| 2 | 30 | ...do... | Furfural 20 | 35 | ...do... | 61.0 | Excellent | −30 −35 | Did not break at 400% elongation with complete recovery. | |
| 3 | 40 | ...do... | Furfural 10 | 70 | Clear | 122.0 | ...do... | −30 −35 | 1,162 | 300 |
| 4 | 50 | Glycerol 40 | ...do... | 80 | Clear—deep red | 92 | ...do... | −30 −35 | 1,620 | 300 |
| 5 | 70 | Glycerol 7.5 | Furfural 22.5 | 100 | Opaque black | 38 | ...do... | | | |
| 6 | 40 | Glycerol 50 | Benzaldehyde 10 | 60 | Transparent | 52 | ...do... | −30 | 2,285 | 225 |
| 7 | 50 | Glycerol 40 | ...do... | 75 | Very clear | 114 | ...do... | −30 | 1,633 | 300 |
| 8 | 60 | Glycerol 35 | Benzaldehyde 5 | 85 | ...do... | 61 | ...do... | −35 −30 | 2,259 | 183 |
| 9 | 70 | Glycerol 7.5 | Benzaldehyde 22.5 | 90 | ...do... | 41 | ...do... | −30 −35 | 3,320 | 210 |
| 10 | 50 | Glycerol 40 | Benzaldehyde 10 | 75 | ...do... | 140.0 | ...do... | −30 | 1,633 | 300 |
| 11 | 50 | ...do... | Crotonaldehyde 10 | 85 | Cloudy | | Good | | Tough [1] | |
| 12 | 50 | ...do... | Salicylaldehyde 10 | 85 | Clear | | ...do... | | ...do... | |
| 13 | 50 | ...do... | m-Tolualdehyde 10 | 85 | ...do... | | ...do... | | ...do... | |
| 14 | 50 | ...do... | Cinnamaldehyde 10 | 80 | Cloudy | | ...do... | | ...do... | |
| 15 | 50 | Ethanol formamide 25 | Benzaldehyde 25 | 65 | Clear | 106 | ...do... | | ...do... | |

[1] Tensile strength not measured, but handling indicated a tensile strength in the range of 500 to 2000 lbs. per sq. in.

In the above examples, the "Percent water absorption" was determined according to A. S. T. M. method D570–42 (A. S. T. M. Standards, 1942, Part III, pages 400–402, published by the American Society for Testing Materials), using the 24-hour immersion test on molded discs. In these tests, the water extracted water-soluble constituents from the moldings. Hence, according to the A. S. T. M. method, the absorption value noted in the above table is the sum of the percentage of water absorbed and the percentage of water-soluble material extracted by the water.

The plasticizing effect of glycerol and other hydroxy compounds on polyvinyl alcohol is generally improved by the addition of an aldehyde. An important advantage is that whereas the hydroxy compound plasticizers generally require addition of considerable quantities of water to obtain the desired plasticization, we have found that our combination of aldehyde and hydroxy compound gives equally good results without the addition of water. Further, compositions made according to our invention take up water from the air to a smaller extent than previously known polyvinyl alcohol compositions. For example, whereas polyvinyl alcohol plasticized with glycerol swells when immersed in water, our compositions swell to a much smaller extent under the same conditions. The aldehyde appears to inhibit the hygroscopic activity of the hydroxy compound.

Our invention is especially useful for plasticizing the completely and nearly completely hydrolyzed grades of polyvinyl alcohol, i. e. those grades which are 85 to 100% hydrolyzed. These Heretofore the 85 to 96% hydrolyzed grades of polyvinyl alcohol have been plasticized with glycerol and the like plus water. By means of our invention, these grades may be plasticized to a greater extent than by the prior methods and to produce articles having better tensile strength. The completely hydrolyzed grades of polyvinyl alcohol (97 to 100% hydrolyzed), which are insoluble in cold water heretofore have been very difficult to plasticize properly even with the addition of water, and hence have not been utilized to any appreciable extent for moldings or extrusions. Our invention permits the ready plasticization of these completely hydrolyzed, cold water insoluble grades to produce articles of great utility.

We claim:

1. A moldable, plasticized composition comprising polyvinyl alcohol containing at least 50 molar percent of hydroxyl groups and, as plasticizers therefor, between 5% and 75%, based on the weight of the polyvinyl alcohol, of benzaldehyde and between 10% and 150%, based on the weight of the polyvinyl alcohol, of glycerol, said composition containing not to exceed that amount of water taken up from the atmosphere by contact therewith.

2. The composition of claim 1 which contains about 1 to 3 parts by weight of glycerol to one part by weight of benzaldehyde.

HAROLD M. SONNICHSEN.
ROBERT F. GAGER.